J. W. BERWICK.
CAMERA.
APPLICATION FILED NOV. 14, 1913.
1,149,493.
Patented Aug. 10, 1915.
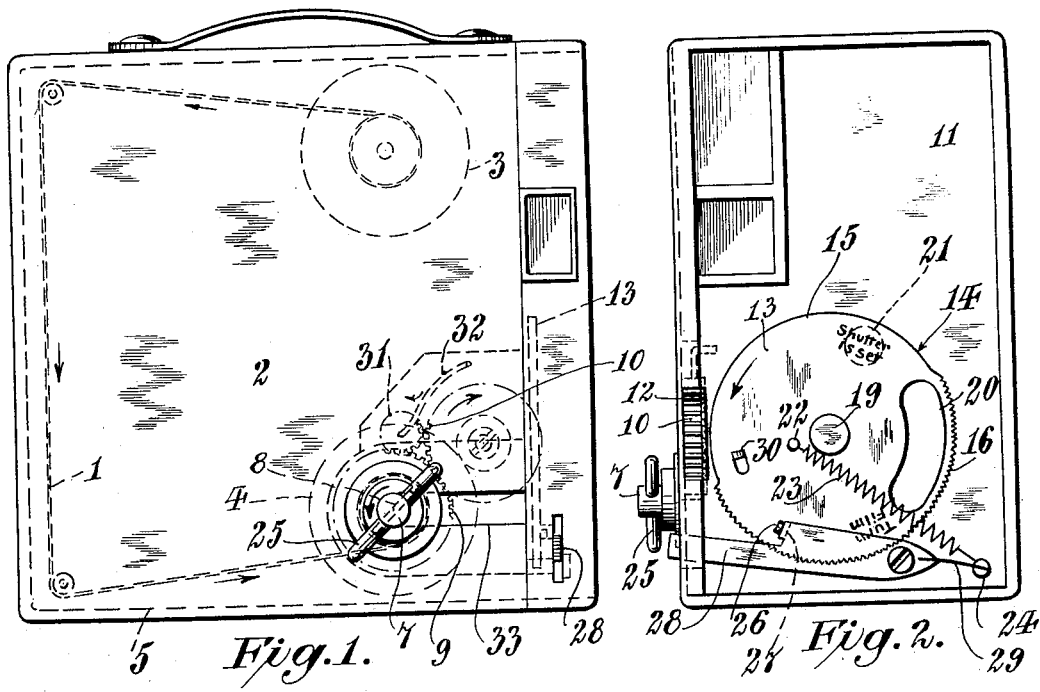
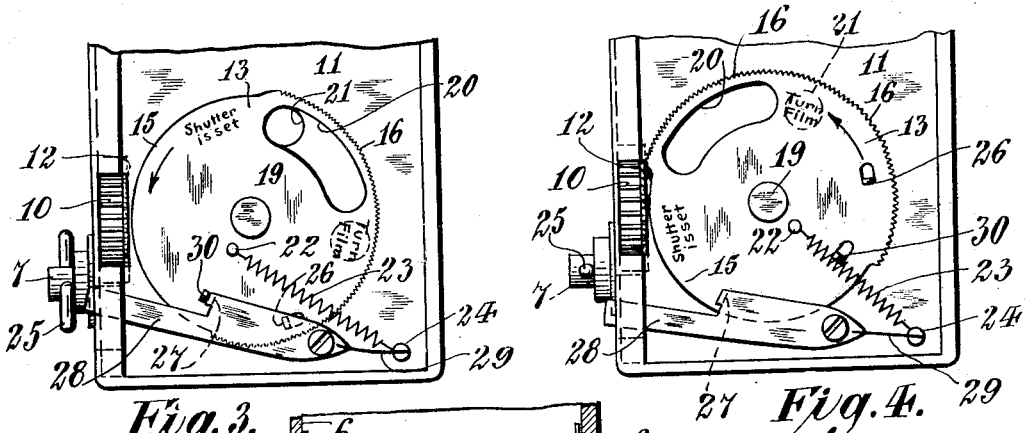
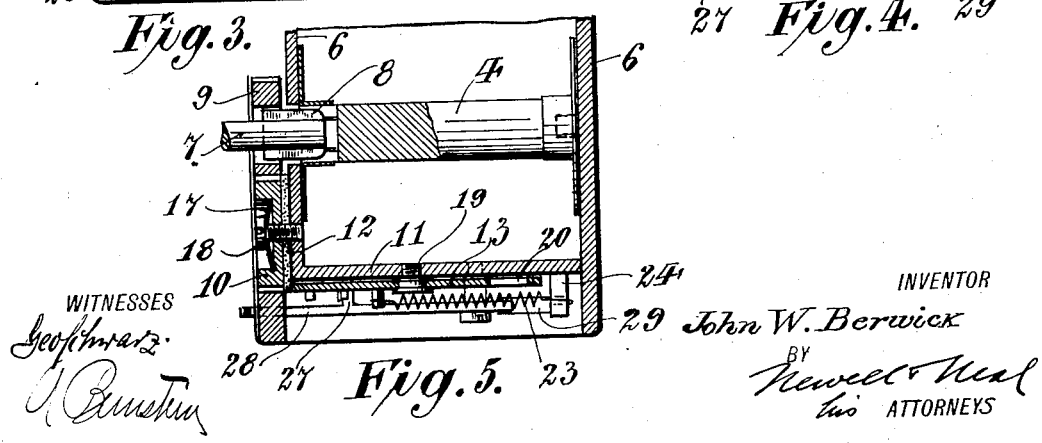
WITNESSES
INVENTOR
John W. Berwick
BY
ATTORNEYS

UNITED STATES PATENT OFFICE.

JOHN W. BERWICK, OF BROOKLYN, NEW YORK.

CAMERA.

1,149,493.  Specification of Letters Patent.  Patented Aug. 10, 1915.

Application filed November 14, 1913. Serial No. 800,900.

*To all whom it may concern:*

Be it known that I, JOHN W. BERWICK, a citizen of the Dominion of Canada, residing at Brooklyn, county of Kings, and State of New York, have invented certain new and useful Improvements in Cameras, of which the following is a clear, full, and exact description.

This invention relates to cameras, and while it is applicable to plate exposing cameras, it is described in the following specification as applied to a film camera.

In the operation of cameras it frequently happens that through inadvertence a second exposure will be made on the same plate or sensitive area.

A principal object of this invention is to prevent this occurrence.

To this end a further object of the invention is to provide an arrangement whereby the mechanism which advances the light sensitive member controls the actuation of the shutter so that a second actuation of the shutter to expose the plate or film is automatically prevented until a second unexposed area of the sensitive member is presented behind the shutter.

A further object of the invention is to provide a camera having a shutter of very simple construction operating effectively and reliably in making exposures and adapted to effect a time exposure or an instantaneous exposure.

Further objects of the invention will appear more clearly hereinafter.

The invention consists in the general combination of parts and simplicity of details hereinafter described, all of which contribute to produce an efficient camera.

A preferred embodiment of my invention will be particularly described in the following specification, while the broad scope of my invention will be pointed out in the appended claims.

In the drawings, Figure 1 is a side elevation illustrating a camera to which the invention is applied: Fig. 2 is a front elevation with a front plate or cover of the camera removed. Where the shutter is of the particular type illustrated, the parts will assume the relation shown in Fig. 2 when the shutter is set ready for an exposure; Fig. 3 is a view similar to Fig. 2 but showing only the lower portion of the camera and presenting the shutter in a position as in making a time exposure; Fig. 4 is a view similar to Fig. 3 but showing the shutter in its sprung or released position, that is immediately after an exposure; and Fig. 5 is a section in a nearly horizontal plane passing through the spool and the shutter, and illustrating details of the parts when the invention has the embodiment illustrated.

Referring more particularly to the parts, when the invention is applied to a film camera, the film 1 is mounted in the camera 2 so as to be guided across the rear wall of the camera so that the film is delivered from a supply-roll 3 to a take-up or receiving roll or spool 4. The camera box comprises an inner box 5 which slides into the outer portion or cover of the box from the right side as used in Fig. 1. Between the side walls 6 of the inner box 5, the spool 4 may be mounted as illustrated, provided with a key 7 at one side which is arranged in any suitable manner to enable the spool to be placed in position. As illustrated, the key 7 may slide out to permit the spool to be inserted and then may be shoved inwardly to engage the radial slots of the spool by means of a feather 8 so as to rotate the spool. I provide means for controlling the shutter of the camera when this spool 4 is rotated to advance the film for the next exposure. This is preferably accomplished by means of a gear-wheel 9 which is co-axial with the key 7, and this gear-wheel 9 preferably meshes with a second gear-wheel 10, the edge of which projects forwardly beyond the shutter-plate 11. On the inner face of this gear-wheel 10, I prefer to provide a cushion 12 of felt or similar material. On the face of the shutter-plate 11 I provide a shutter 13 which may simply consist of a disk such as that illustrated, said disk having a cam edge 14 having a depressed portion 15 and an elevated portion 16 which is preferably roughened or serrated in any suitable manner. The gear-wheel 10 is preferably pressed resiliently toward the edge of the shutter 13 by means of a spring washer 17 held in place by the pivot screw 18 of the gear-wheel. The arrangement is such that when the elevated portion 16 of the disk is adjacent to the gear-wheel 10, the cushion 12 will be pressed by the gear-wheel against the disk 13 so that when the gear-wheel 10 rotates, it will rotate the shutter on its central pivot 19. The disk 13 of the shutter is preferably provided with an opening or gap 20 which is adapted to pass the exposing opening 21 of the camera.

At some rotating point on the disk such as the point 22, a spring 23 may be attached for the purpose of effecting the exposure and one end of the spring may be held at a fixed point 24. When this shutter is in the position shown in Fig. 4, the elevated portion 16 of the shutter is in engagement with the cushion 12. This is the position after an exposure. When the bar 25 of the key 7 is rotated to advance the film for the next exposure, the edge of the cushion 12 engaging the edge 16 rotates the shutter in the direction of the arrow in Fig. 4, that is, it rotates the shutter toward its set position. When this rotation has continued sufficiently to bring the point 22 beyond the line joining the pivot 19 of the shutter with the point 24, the spring will tend to pull the shutter away from its set position and toward its sprung position. The shutter, however, is prevented from going to its sprung position in any suitable manner as by means of a stop 26 which may engage with a detaining means or finger 27 on a manually controlled member such as a lever 28. In this way the shutter is brought into the position shown in Fig. 2 and in this position the edge 15 is out of contact with the cushion 12 (or at least does not engage it with sufficient force) to enable it to rotate the shutter. The lever 28 is held in a normal position by any suitable means such as the spring 29, and the end of the lever may project through a slot or in any suitable manner be arranged to be operated from the exterior of the camera. When the lever is in the position shown in Fig. 2, if the end of the lever is moved down, the stop 28 will be released and the spring 23 will immediately pull the shutter disk around to the position indicated in Fig. 4. This will give a single instantaneous exposure as the gap 20 passes the exposing opening 21.

The lever or hand controlled member 28 is independent of the take-up roll. Its movement effects a single exposure, and the next movement of the take-up roll sets the shutter for another exposure.

If it is desired to make a time exposure, the lever 28 will be moved up instead of down so that the exposing movement of the shutter will be arrested by means of a stop 30 which will come in contact with the finger 27 as indicated in Fig. 3. The lever can then be held in this position with the gap 20 at the exposing opening as long as desired, and when the lever is moved down, evidently the stop 30 will be released and the shutter will then close, that is, it will continue its movement until it comes into the position illustrated in Fig. 4. In this way I effect an intermittent connection between the film-advancing means and the shutter, so that the shutter automatically disconnects itself from operation by the film-advancing means when it is in a set position, and after an exposure the shutter is always left in a position so that it cannot be actuated to make a second exposure until the film is advanced to present a new unexposed area.

In order to prevent any possibility of the rotating movement of the key inadvertently being made in the wrong direction, which might unset the shutter, I provide any suitable check device to prevent such a reverse rotation. In order to accomplish this, I may provide simply a pinion 31 such as illustrated in Fig. 1, which normally meshes with the gear-wheel 9 only, being pressed by a spring 32 away from the gear-wheel 10. This locking pinion 31 evidently will not prevent a rotation in the direction of the arrow but if a rotation toward the right occurs, it will immediately move over against the gear-wheel 10 and intermesh with the teeth thereof and lock both gears 9 and 10 against further rotation in that direction.

It will be observed that in the construction of the camera illustrated, a slot 33 is provided in the edge of the outer cover of the camera which permits the shank of the key 7 to slide into position when the inner box 5 is shoved into place.

While the shutter is described as consisting of a simple disk, it is evident that the shutter may be of any suitable construction which will effect the purposes of this invention, namely to permit a single exposure to be made but to prevent a second exposure until the light sensitive member is advanced preparatory to making the second exposure.

Attention is called to the fact that according to my invention the light-sensitive member is preferably advanced positively by rotation of the same part the rotation of which sets the shutter for the next exposure. By the term positively, I mean without intervention of any other motive force, that is, the force which moves the thumb head or button 7 is directly transferred to the roll which draws the film along.

It is understood that the embodiment of the invention set forth above is only one of the many embodiments or forms the invention may take, and I do not wish to be limited in the practice of the invention nor in my claims to the particular features set forth above.

What I claim is:—

1. In a camera, in combination, a shutter, a spring for actuating the same to effect an exposure, a hand operated take-up roll for advancing the film before making the exposure, and means actuated by the rotation of said take-up roll for extending said spring before making the next exposure.

2. In a camera, in combination, a shutter, a spring for moving the same to effect an exposure, hand operated detaining means for detaining said shutter to prevent the same from effecting an exposure, a take-up roll for advancing the film and for moving the shutter into engagement with said detaining means after each exposure.

3. In a camera, in combination, a shutter, a spring for moving the same to effect an exposure, hand operated detaining means for detaining said shutter to prevent the same from effecting an exposure, a take-up roll for advancing the film, said shutter having a "set" position and being movable independently of said take-up roll by said spring from said "set" position in effecting the exposure, and means for effecting a connection between said take-up roll and said shutter after the exposure to enable the rotation of said take-up roll to set the shutter.

4. In a camera, in combination, a take-up roll for advancing the film before effecting the exposure, a shutter, a hand controlled member independent of said take-up roll, means controlled thereby for actuating said shutter to effect a single exposure, and means actuated by the said take-up roll for setting said shutter for effecting a second exposure.

5. In a camera, in combination, means for holding a light-sensitive member, a shutter adapted to assume a "set" position for making the exposure, and adapted to assume a "sprung" position after an exposure, advancing means for advancing said light-sensitive member for a second exposure, a moving part moving therewith, said shutter having means for connecting itself with said moving part when in its "sprung" position whereby the actuation of said advancing means moves said shutter toward its set position, said shutter having means for disconnecting itself from said moving part when in its set position whereby the actuation of said advancing means may then be incapable of moving said shutter.

6. In a camera, in combination, means for holding a light-sensitive member, a shutter, means for holding said shutter in a set position for making an exposure, means for advancing said light-sensitive member, a moving part adapted to rotate when the light-sensitive member is advanced, said shutter having an edge adapted to engage with said moving part to rotate said shutter toward its "set" position when the light-sensitive member is advanced, said edge having a depressed portion adapted to be out of contact with said moving part when the shutter is in its "set" position thereby preventing the movement of said shutter by said moving part until the exposure is made.

7. In a camera, in combination, means for holding a light-sensitive member, a shutter, means for holding said shutter in a set position for making an exposure, means for advancing said light-sensitive member, a moving part adapted to rotate when the light-sensitive member is advanced, said shutter having an edge adapted to engage with said moving part to rotate said shutter toward its "set" position when the light-sensitive member is advanced, said edge having a depressed portion adapted to be out of contact with said moving part when the shutter is in its "set" position thereby preventing the movement of said shutter by said moving part until the exposure is made, a spring connected with said shutter and tending to move the same to make an exposure when said shutter is in its "set" position.

8. In a camera, in combination, means for holding a light-sensitive member, means for advancing said light-sensitive member after an exposure has been made, a moving part arranged to rotate when said last means is actuated, shutter mechanism including a disk having a cam edge coöperating with said moving part and engaging therewith to enable said moving part to move said shutter toward its "set" position and arranged to prevent the movement of said shutter by said moving part when said shutter is in its "set" position, and a manually-operated member controlling the said shutter to make the exposure.

9. In a camera, in combination, means for holding a light-sensitive member, means for advancing said light-sensitive member after an exposure, a moving part adapted to rotate when said last means is actuated, shutter mechanism including a disk having means for intermittently connecting the same with said moving part whereby the rotation of said moving part may rotate said disk toward its "set" position, a spring tending to move said shutter from its "set" position, said shutter having a stop, and a manually-operated member coöperating with said stop to hold said shutter in its "set" position.

10. In a camera, in combination, means for holding a light-sensitive member, means for advancing said light-sensitive member after an exposure, a moving part adapted to rotate when said last means is actuated, shutter mechanism including a disk having means for intermittently connecting the same with said moving part whereby the rotation of said moving part may rotate said disk toward its "set" position, a spring tending to move said shutter from its "set" position, said shutter having a stop, and a manually-operated member coöperating with said stop to hold said shutter in its "set" position, said shutter having a second stop coöperating with said manually-operated member to hold said shutter open for making a time exposure.

11. In a camera, in combination, means for holding a light-sensitive member, a shutter comprising a rotatable disk having a gap therein, through which an exposure may be made, a lever for controlling the movement of said shutter, said shutter having means coöperating with said lever to hold said shutter in its "set" position ready for an exposure, a spring connected with said shutter tending to move said shutter from its "set" position, a second means coöperating with said lever which may arrest the movement of said shutter to make a time exposure, and means for controlling the actuation of said shutter through the agency of said means for advancing said light-sensitive member.

12. In a camera, in combination, a take-up roll for advancing the film before effecting the exposure, a shutter, a hand controlled member independent of said take-up roll, means controlled thereby when moved from its normal position for actuating said shutter to effect a single exposure, means for normally holding said hand controlled member in its normal position, and means actuated by the said take-up roll for setting said shutter for effecting a second exposure.

13. In a camera, in combination, a shutter comprising a disk having a cam edge, said cam edge having an elevated portion and a depressed portion, a rotatable member located adjacent to said edge, means for yieldingly pressing said rotatable member and said disk toward each other to effect an engagement between the said elevated portion of said cam edge and said rotatable member and arranged to prevent an engagement of the depressed portion of said edge with said member, a spring associated with said shutter, and a manually-controlled member coöperating with said shutter to control the same to make the exposures.

14. In a camera, in combination, a shutter comprising a disk having a cam edge, said cam edge having an elevated portion and a depressed portion, a rotatable member located adjacent to said edge, means for yieldingly pressing said rotatable member and said disk toward each other to effect an engagement between the said elevated portion of said cam edge and said rotatable member and arranged to prevent an engagement of the depressed portion of said edge with said member, a spring associated with said shutter, and a manually-controlled member coöperating with said shutter to control the same to make the exposures, means for holding a light-sensitive member, and means for advancing the light-sensitive member connected with said rotatable member for controlling said shutter therefrom.

15. In a camera, in combination, a take-up roll for advancing the film before effecting the exposure, a shutter, a hand controlled member independent of said take-up roll, means controlled thereby when moved from its normal position for actuating said shutter to effect a single exposure, means for normally holding said hand controlled member in its normal position, means actuated by the said take-up roll for setting said shutter for effecting a second exposure, and a check device for preventing a reverse movement of said take-up roll.

16. In a camera, in combination, a take-up roll for advancing the film before effecting the exposure, a shutter, a hand controlled member independent of said take-up roll, means controlled thereby for actuating said shutter to effect a single exposure, and means on said shutter for effecting a connection with said take-up roll after the exposure is effected to move the shutter and thereby set the same for the next exposure.

Signed at New York, N. Y. this 13" day of November 1913.

JOHN W. BERWICK.

Witnesses:
BEATRICE MIRVIS,
ABRAM BERNSTEN.